(No Model.)  A. P. MASSEY.  3 Sheets—Sheet 1.
AIR BRAKE.

No. 501,016.  Patented July 4, 1893.

WITNESSES:
H. A. Oberly
W. H. Ford

INVENTOR
Albert P. Massey

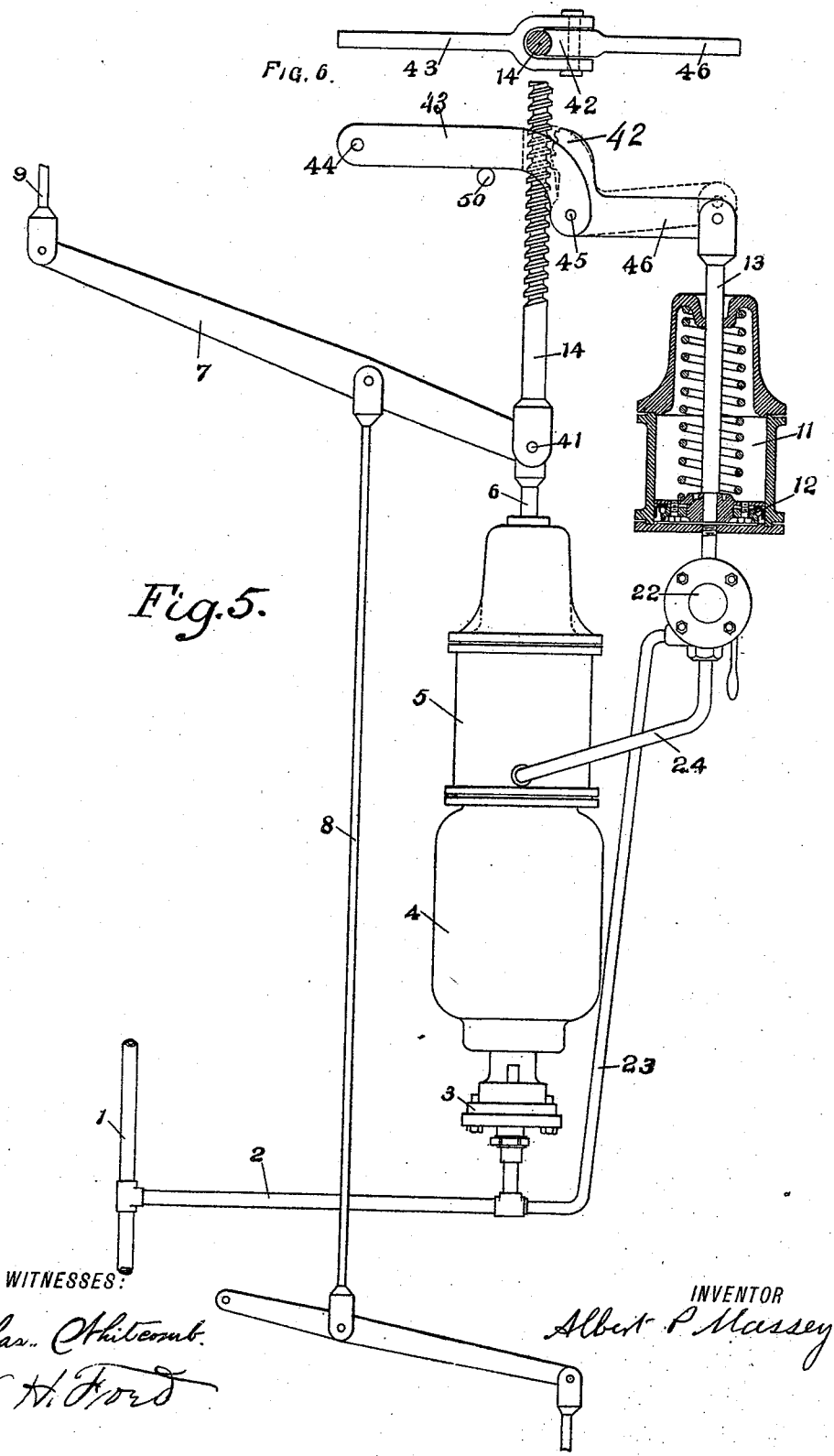

UNITED STATES PATENT OFFICE.

ALBERT P. MASSEY, OF WATERTOWN, NEW YORK.

AIR-BRAKE.

SPECIFICATION forming part of Letters Patent No. 501,016, dated July 4, 1893.

Application filed April 18, 1892. Serial No. 429,561. (No model.)

*To all whom it may concern:*

Be it known that I, ALBERT P. MASSEY, a citizen of the United States, and a resident of Watertown, county of Jefferson, State of New York, have invented certain new and useful Improvements in Air-Brakes, of which the following is a specification.

The object of my invention is to produce a fluid pressure brake in which a greater amount of braking force may be obtained without adding materially to the quantity of fluid-pressure used, and to enable the engineer to vary this additional force at will without releasing the ordinary automatic brake.

Figure 1:
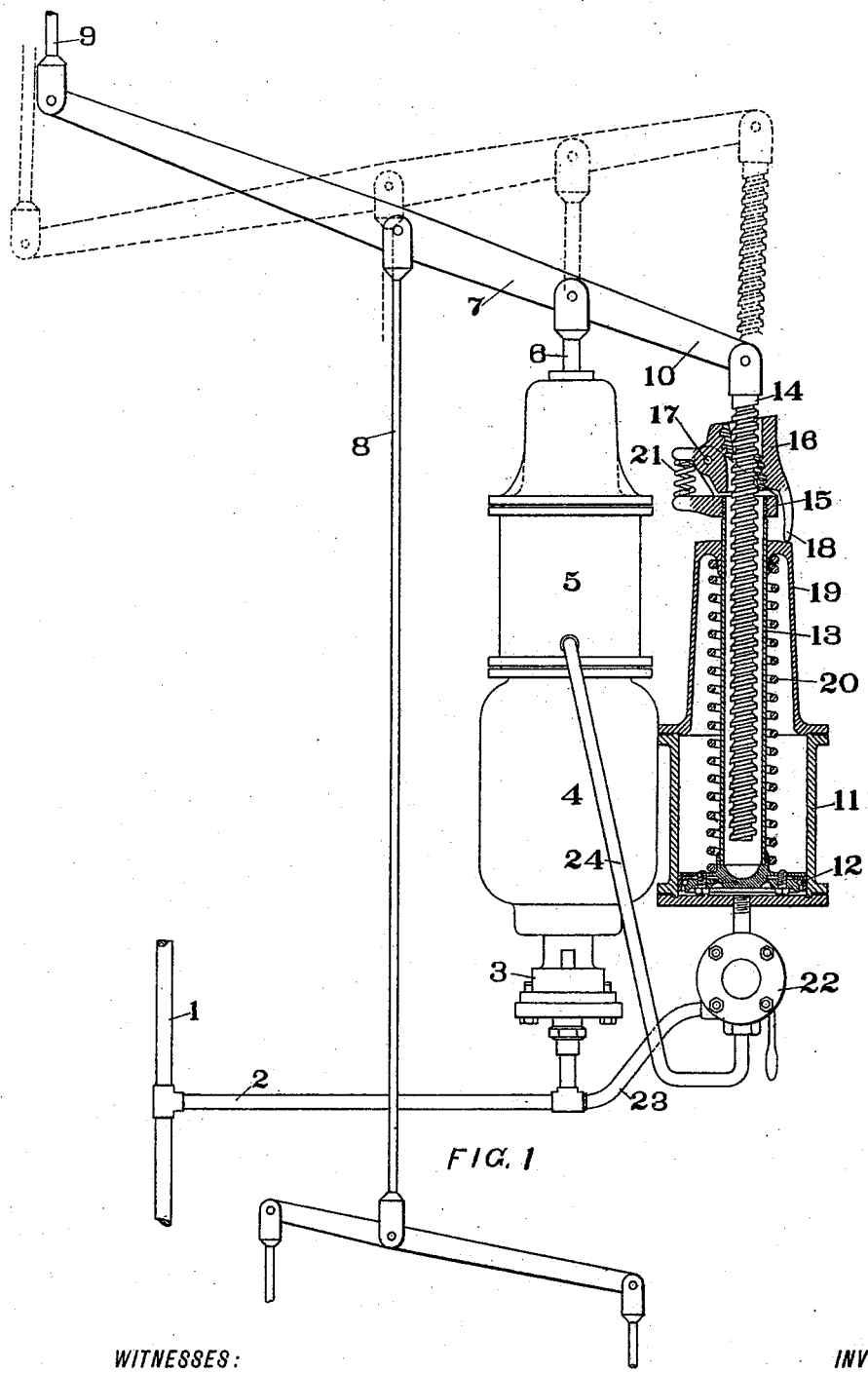
Figures 3, 4:
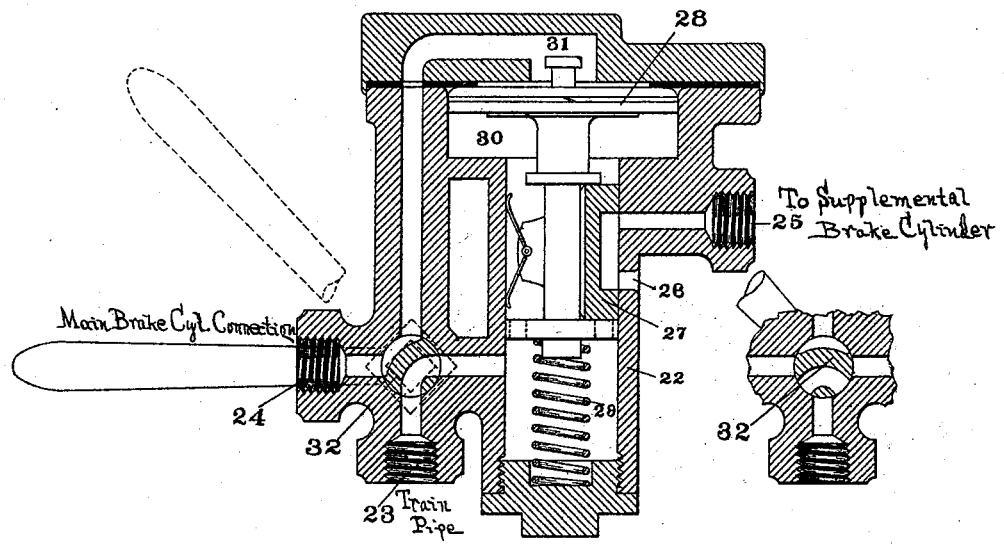
Figure 2:
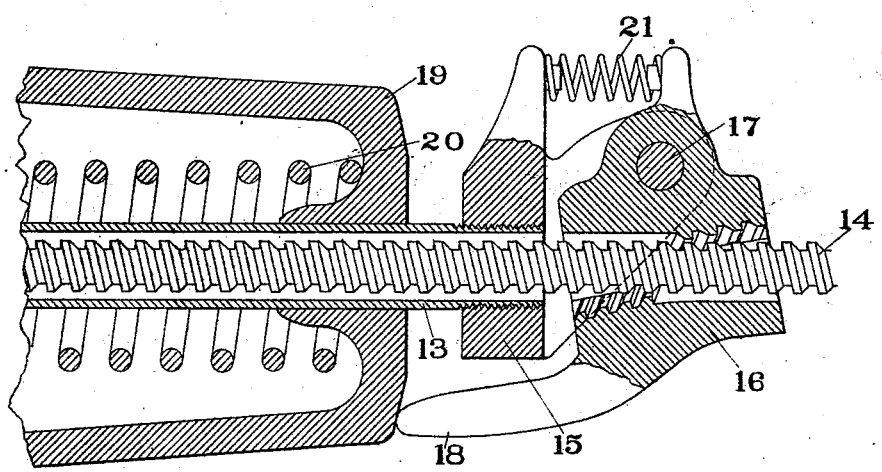

In the drawings Figure 1 shows the mode of attaching the apparatus to the ordinary fluid-pressure automatic braking apparatus used on railway cars. The additional cylinder is in section. Fig. 2 is an enlarged sectional view of the outside end of the piston rod with pawl and ratchet. Fig. 3 is a sectional view of a valve for bringing the supplemental piston into action. Fig. 4 shows the cut-out cock in another position. Fig. 5 is a modification, part of which is shown in Fig. 6.

In the drawings 1 represents the train-pipe of an automatic fluid pressure brake system.

2 is the connection between the train-pipe and the triple valve.

3 is a triple valve.

4 is an auxiliary reservoir.

5 is a brake cylinder.

6 is a piston rod.

7 is a floating lever.

8 is a pull rod connecting the floating lever 7 to the brake levers on one truck and 9 is a pull rod connecting the lever 7 with the brake levers on the other truck.

10 is an extension to the floating lever 7.

11 is a supplemental cylinder containing a piston 12 with a hollow piston rod 13. Inside the hollow piston rod is a push rod 14 connected by a pin to the extended arm 10 of the floating lever 7. This push rod has a ratchet, or teeth, along its length.

To the enlarged head 15 of piston rod 13 a pawl 16 is pivoted by pin 17. This pawl is adapted to engage with the teeth of the push rod 14 in one position and to be disengaged from said teeth in another position. When the arm 18 is pressed against the cylinder cap 19 by the spring 20 which returns the piston, the pawl 16 is disengaged from the teeth of push rod 14 and the rod is free to move through the pawl in either direction. When the piston has pushed the pawl out far enough to clear the arm 18 from cap 19 the spring 21 will revolve the pawl sufficiently to engage the teeth of the pawl with the teeth on push rod 14 and thus communicate any stress there may be on piston 12 to push rod 14 and thus to the floating lever 7 and the brake rigging on the car. The piston 12 is brought into action by means of valve 22 which is connected to the train-pipe by a pipe 23 and with the main brake cylinder by pipe 24.

Fig. 3 shows the actuating valve 22 in section. Inlet 23 is connected to the train-pipe. Inlet 24 is connected to the main brake cylinder. Outlet 25 is connected to the supplemental cylinder and outlet 26 is open to the atmosphere.

27 is a slide valve with a recess which in running position connects the passage 25 with the outlet 26, as shown in the drawings.

28 is a piston for actuating valve 27. A spring 29 may be used to assist in the return stroke. When in use the inner portion 30 of this valve case is in connection with the train-pipe and has the same fluid pressure as the train-pipe; the outer portion 31 is in connection with the main brake cylinder and has the same fluid pressure as in the main brake cylinder. In the ordinary automatic brake system, when the train is running, the brake cylinder is open to the atmosphere and the train pipe has about seventy pounds fluid pressure. Therefore the piston 28 would have atmospheric pressure on side 31 and about seventy pounds fluid pressure on side 30.

In operation the functions of the train-pipe, triple-valve, reservoir, and main cylinder, are as usual in an automatic brake system. If the train-pipe pressure is reduced the triple-valve will act to let fluid pressure pass from reservoir 4 to cylinder 5 and thus push out piston 6 and move the floating lever 7 to the dotted position, thus applying the brakes in the ordinary way. This motion of the lever 7 with its extension arm 10 would draw the push-rod 14 to the position shown by the dotted lines. If valve 22 was cut out by four-way cock 32, there would be no further action, and when the brakes were released the push rod 14 would be returned to its place as the pawl 16 is normally in a position that will not engage the teeth on rod 14. If, however, the four-way cock 32 is open as shown in Fig. 3, when the train pipe pressure is reduced and the brake is applied through the triple-valve and piston 6 and the lever 7 is moved to the position shown by the dotted lines, the fluid pressure in the cylinder 5 will be communicated through pipe 24 to the outside 31 of piston 28 (Fig. 3). This will have no effect until the brake-cylinder pressure exceeds the train-pipe pressure when it will cause piston 28 to move valve 27 and uncover the port leading through 25 to the supplemental brake-cylinder 11 at the same time closing exhaust outlet 26. The train-pipe pressure admitted to supplemental cylinder 11 will cause piston 12 to move outward; a short outward motion of the piston rod 13 will disengage the arm 18 from the cap 19 and allow the spring 21 to throw the teeth of the pawl 16 into mesh with the teeth on the push-rod 14 and thus communicate the stress on piston 12 to the brake lever 7 and thence to the brake system. As the lever 7 and push-rod 14 will have already been moved to the position shown by the dotted lines and the pawl 16 will engage with the teeth on the push-rod after it is drawn out, a very short stroke of piston 12 will communicate an additional stress on the brake system. Consequently only a small portion of fluid pressure will need to pass from the train-pipe to accomplish this object. The attachment of this apparatus to the usual brake levers may be made to add any desirable quantity to the force furnished by the primary apparatus. As there would be open communication between the supplemental cylinder and the train-pipe, the engineer could reduce the brake pressure by releasing air on the engine, or could increase the brake pressure by increasing the pressure in the train-pipe at will, up to the pressure that would release the regular triple valve brake. He could therefore obtain a very great braking force when the train was at a high velocity and reduce that force at will as the speed was reduced, and thus prevent sliding wheels, although using at first a greater braking force than the weight of the cars.

In order to release the brakes the engineer increases the pressure in the train-pipe. This will increase the brake pressure momentarily, but when the pressure in chamber 30 plus the spring 29, exceeds the pressure in 31 which will be the same as in the brake cylinder 5 and reservoir 4, the piston 28 will close passage 25 from the train-pipe and open it to the atmosphere through exhaust 26, thus releasing the fluid pressure from cylinder 11 and allowing spring 20 to return piston 12 to place. This motion will draw back pawl 16 until its arm 18 has come in contact with cap 19 and tilted the pawl out of engagement with push rod 14. As the fluid pressure in the train-pipe increases it will operate the triple-valve to release the main piston in cylinder 5 and the apparatus will return to the position shown in the drawings. If the train-pipe pressure should be reduced suddenly, an emergency application would ensue in a quick action automatic brake; the same action as above described would also then take place in this apparatus.

Further, this device may be used for increasing the braking power on loaded cars, for the four-way cock may be set to cut it out on an empty car and only use the ordinary cylinder but it may be cut in when the car is loaded whereupon the additional braking force will be obtained on the loaded car without affecting the other cars in the train whether loaded or empty.

So far as I have described only that form of my invention shown in Figs. 1, 2, 3 and 4, but as will be obvious many other forms of apparatus may be made which will embody my invention. Thus the rod 14 need not occupy the piston rod 13 of the supplemental cylinder 11; for obviously all that is necessary is that this rod be in position to transmit the power of piston 12 to the brakes. In Fig. 5, I have shown this rod 14 as pinned to piston rod 6 of brake cylinder 5, and as playing freely through a clutch composed of levers 43 and 46, so long as piston rod 13 of supplemental cylinder 11 is not forced out; but when pressure is admitted to cylinder 11, as before described, the outward motion of piston 12, and its rod 13 will cause clutch arm 42 of lever 46 to grip rod 14; and thus the power of piston 12 will act through rod 14 to increase the force with which the brakes are applied as before described. Lever 43 has a fixed fulcrum at 44, and a fixed stop at 50, and the grip on rod 14 by levers 43 and 46 will be clear from Fig. 6 which is a detached view of levers 43 and 46 with rod 14 in section.

Of the many forms of my invention which I have contemplated I believe these to be, on the whole, preferable; but obviously the form of clutch mechanism by which supplemental piston rod 13 engages the brake rigging, the form of valve device by which compressed air is admitted at the proper time to operate piston 12 of supplemental cylinder 11, and all other details of construction may be widely varied; for my main invention is a supplemental brake cylinder, combined with the main brake cylinder and operating to produce an additional stress on the brake rigging, as fully explained; and a second feature of my invention is the variation of the stress of the piston rod of this supplemental cylinder by varying the pressure in the train pipe within limits as above explained; the supplemental cylinder being when in operation open directly to the train pipe.

What I claim as my invention is—

1. In a fluid pressure brake system the combination with a main brake cylinder, its piston and piston rod and suitable levers and brake rigging to communicate the power of the main brake cylinder to the brake shoes; of a supplemental brake cylinder; its piston and piston rod; and a clutch mechanism, one member carried by the brake rigging and the other member operated by the supplemental piston to connect the supplemental piston with the brake rigging; all substantially as set forth.

2. In a fluid pressure brake system the combination with a main brake cylinder, its piston and piston rod and suitable levers and brake rigging to communicate the power of the cylinder to the brake shoes; of a supplemental brake cylinder, its piston and piston rod; a clutch to connect the supplemental piston with the brake rigging; a valve to open a passage from the train-pipe to the supplemental brake cylinder and a piston controlled by the difference in pressure between the train pipe and the main brake cylinder to actuate the valve, all substantially as set forth.

In testimony that I claim the foregoing as my invention I have signed my name, in presence of two witnesses, this 16th day of April, 1892.

ALBERT P. MASSEY.

Witnesses:
 HENRY W. BOYER,
 MICHAEL J. MORKIN.